(12) United States Patent
Kraft et al.

(10) Patent No.: US 7,302,324 B2
(45) Date of Patent: Nov. 27, 2007

(54) DEVICE FOR A DATA AND ENERGY MANAGEMENT IN A VEHICLE

(75) Inventors: Dieter Kraft, Gerlingen (DE); Volker Schlechter, Korntal (DE); Bernd Aupperle, Steinheim (DE); Norbert Hoffmann, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/549,265

(22) PCT Filed: Oct. 18, 2003

(86) PCT No.: PCT/DE03/03504

§ 371 (c)(1),
(2), (4) Date: Jul. 19, 2006

(87) PCT Pub. No.: WO2004/080764

PCT Pub. Date: Sep. 23, 2004

(65) Prior Publication Data

US 2006/0261843 A1 Nov. 23, 2006

(30) Foreign Application Priority Data

Mar. 13, 2003 (DE) ................. 103 11 396

(51) Int. Cl.
*G06F 7/00* (2006.01)
(52) U.S. Cl. ............... 701/36; 701/1; 700/286; 307/9.1
(58) Field of Classification Search .......... 701/1, 701/36; 307/9.1, 38; 180/65.1; 700/286, 700/295

See application file for complete search history.

(56) References Cited

U.S. PATENT DOCUMENTS

| 4,855,922 A | * | 8/1989 | Huddleston et al. ........ 700/295 |
| 5,637,933 A | | 6/1997 | Rawlings et al. |
| 6,301,528 B1 | | 10/2001 | Bertram et al. |

FOREIGN PATENT DOCUMENTS

| DE | 195 26 809 | 1/1997 |
| DE | 197 26 299 | 1/1998 |
| DE | 296 14 182 | 2/1998 |
| DE | 198 55 245 | 6/1999 |
| DE | 198 38 248 | 3/2000 |
| DE | 199 21 451 | 3/2000 |
| DE | 199 15 253 | 10/2000 |
| DE | 101 16 925 | 1/2003 |
| WO | 02 063753 | 8/2002 |

* cited by examiner

*Primary Examiner*—Gertrude A. Jeanglaude
(74) *Attorney, Agent, or Firm*—Kenyon & Kenyon LLP

(57) ABSTRACT

A device for a data and energy management in a vehicle having a connecting arrangement via which a superordinate control unit may be connected to at least one subordinate control system, respectively, the superordinate control unit having a superordinate interface and the at least one subordinate control system having a subordinate interface, using which, the superordinate control unit and the at least one subordinate control system exchange data of at least one electrical user via the connecting arrangement, for the purpose of a bidirectional communication. In an advantageous manner there is the possibility that in the case of an energy demand by the at least one subordinate control system via a first connecting arrangement, purposefully at least one additional connecting arrangement is able to be deactivated and/or activated by at least one superordinate switching arrangement of the superordinate control unit, in order to fulfill the desired energy demand.

13 Claims, 3 Drawing Sheets

DEVICE FOR A DATA AND ENERGY MANAGEMENT IN A VEHICLE

FIELD OF THE INVENTION

The present invention relates to a device for a data and energy management in a vehicle.

BACKGROUND INFORMATION

A vehicle electrical system for motor vehicles is known from German Published Patent Application No. 195 26 809, having multiplex control in which the electrical user and switch are connected via double-wire branch line to a common double-wire energy line. The double-wire branch lines end in each case in a plug/user combination or plug/switch combination that are able to be connected to a switch or user, which, on their part, include a control element or a switching element, the control element being made up of a transmitter/receiver for communication with the other control elements that is coupled to the branch line, of a switching electronics system for controlling the switching element and of a device for monitoring the current flowing to the user.

It is a disadvantage, in such a vehicle electrical system, that the stability of the vehicle electrical system cannot basically be ensured, since sufficient power resources are not able to be supplied to all users, especially those which have a high energy requirement.

SUMMARY OF THE INVENTION

The device according to the present invention includes a data and energy management in a vehicle, connecting means being provided via which a superordinate control unit may be connected to at least one subordinate control system. Both the superordinate and the subordinate control systems include in each case an interface for data transmission, so that an electrical user that is connected to the subordinate control system is able to exchange data via the connecting means with the superordinate control unit, for the purpose of a bidirectional communication.

In situations that are particularly critical to driving, especially in the case of safety-relevant, electrical users, there is a clearly increased energy requirement compared to a normal driving situation. Thus, it is known, for example, that modern braking systems have to expend substantially more electrical energy in the case of an initiated full braking than the vehicle electrical system is able to make available to them at that moment. Additional vehicle-critical situations come about at full throttle, at abrupt steering movement or when the capacity of the vehicle's battery has reached its critical condition. In these cases too, the energy supply of the corresponding electrical users has to be safeguarded by the superordinate control unit. For this purpose, in the superordinate control unit, a superordinate switching means is provided, using which, in a specific way, connecting means may be deactivated and/or activated in an especially advantageous manner if an energy requirement is requested, by a control system connected to another connecting means, which clearly goes beyond the usual quantity for the normal operation of the vehicle.

In one expedient refinement, within the superordinate control unit, means are provided for storing the state of the at least one subordinate control system and/or the at least one electrical user. In this way, the occurrence of errors in the entire electrical system of the vehicle may be documented and, for instance, made available to authorized repair shops.

In addition, the superordinate control unit, in one preferred embodiment, includes at least one current recording means which detects an overall current of all active electrical users, that are connected to the connecting means, flowing through the superordinate switching means. Consequently, it is possible, in an advantageous manner, selectively to deactivate this connecting means connected to the superordinate switching means, when the total current flowing has exceeded a predefined boundary value.

In one expedient further development, the present invention provides that the connecting means receive an additional supply line, besides the first supply line, which is supplied via a superordinate voltage transformer of the superordinate control unit at a voltage that is different from the first supply line. Consequently, it is possible, in a very cost-saving and space-saving way, to implement a multi-voltage vehicle electrical system for motor vehicles without additional expenditure.

An additional advantage of the present invention comes about in that the connecting means of the vehicle's electrical system, besides the at least one supply line, include an additional supply line as closed circuit current line, using which the electrical users are able to be supplied redundantly. In this manner it is ensured that safety-relevant users, such as electromotors supporting steering, are available even during interruption in the supply line, for the operation of the vehicle without danger. In addition, supplying the electrical users, which have to be active even in the turned-off and/or locked vehicle, is ensured by the closed circuit current line. As an example, we might bring up here the send-receive electronic system for a vehicle's own locking system.

DETAILED DESCRIPTION

Figure 1:
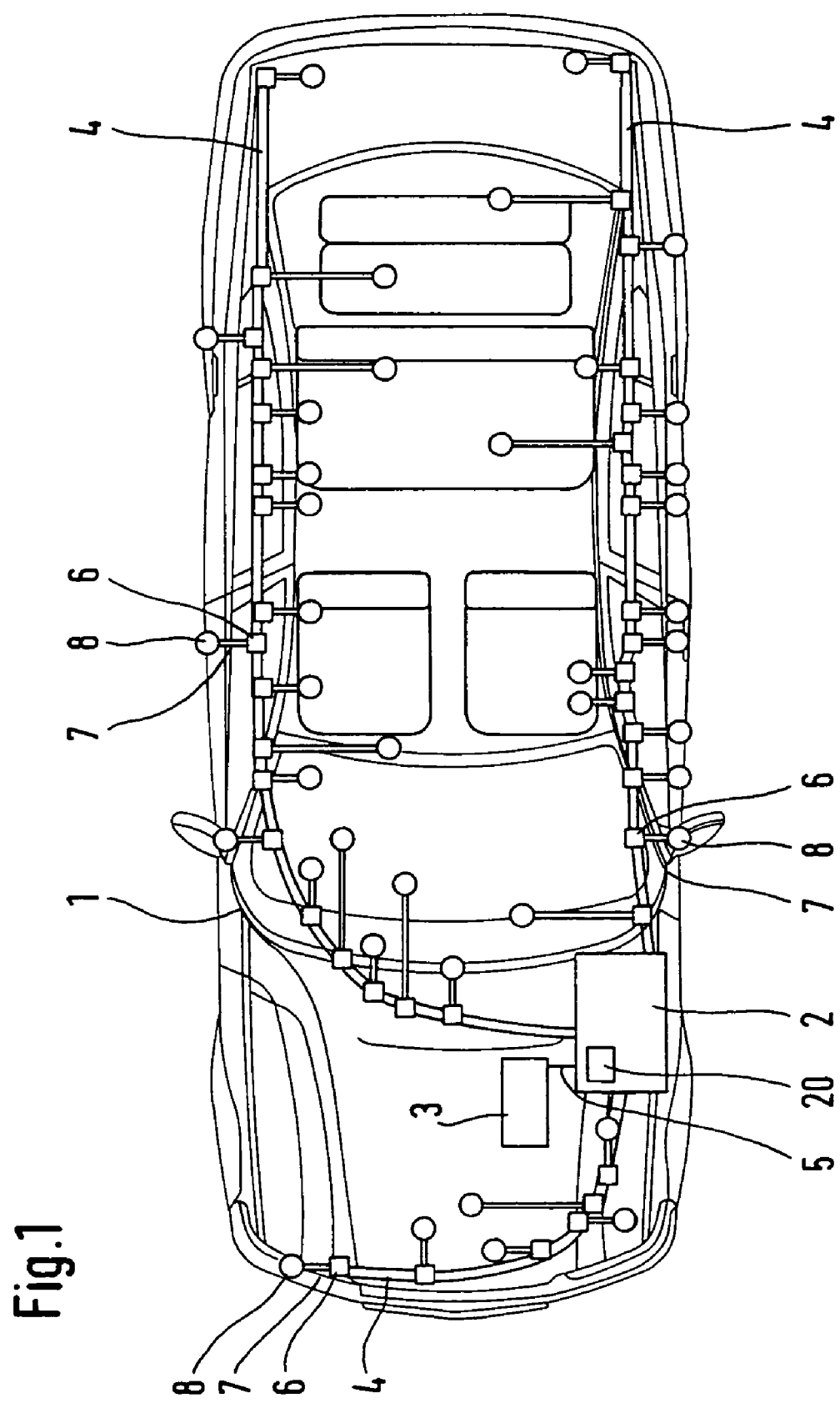
FIG. 1 shows a schematic representation of a possible embodiment of a data and energy management in a vehicle.

FIG. 1 shows a device for a data and energy management in a vehicle 1, which in the following will be designated as vehicle electrical system, to be brief. The vehicle electrical system includes at least one connecting means designed as a stub line 4, which is connected in a neutral point manner to superordinate control unit 2. Because of the neutral point manner of positioning connecting means 4 in the vehicle, energy regions are created that are independent of one another. Preferably, the at least one connecting means 4 is designed as a flat ribbon cable. In this way, a considerable reduction in weight and space is ensured, compared to conventional cable harnesses. Via a battery connecting means 5, which is able to be deactivated or activated with the aid of a battery switching means 20, there is a direct connection of superordinate control unit 2 to vehicle battery 3. Along the stub line, there is situated at least one electrical user 8, for instance, a window lift motor, seat heating, a brake power assist unit, a headlight or the like, and is contacted to the stub line in each case via a branch line 7, using a subordinate control system 6. In order to supply both safety-relevant and also less safety-relevant electrical users, which lie closely together in space, in a differentiable manner, it is possible to equip one region of vehicle 1 using several parallel connecting means 4.

Figure 2:
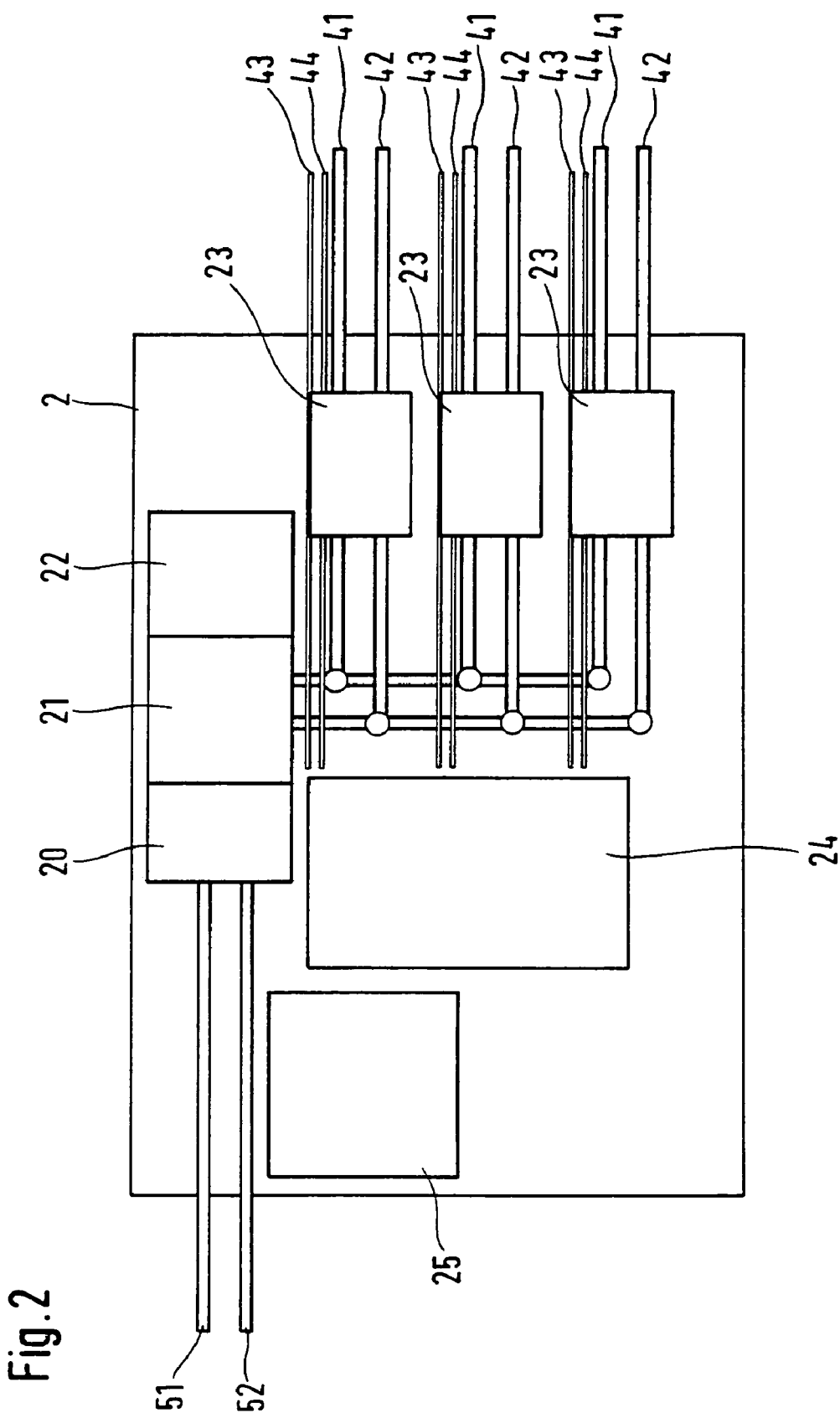
FIG. 2 shows a schematic representation of a possible embodiment for a superordinate control unit.

FIG. 2 shows a schematic exemplary embodiment of superordinate control unit 2. It is made up essentially of a superordinate battery switching means 20, a superordinate current recording means 21, a superordinate voltage transformer 22, at least one superordinate switching means 23, a superordinate interface 24, as well as of means of storage 25. Superordinate control unit 2 forms the neutral point of the vehicle electrical system, and is first of all connected via battery connecting means 5 directly to vehicle battery 3, as well as secondly via superordinate switching means 23 and connecting means 4, designed as a stub line, to subordinate control system 6. In this context, battery connecting means 5 is made up of at least one first battery supply line 51 for energy supply, while the ground connection is assured via the vehicle body. However, in an additional embodiment, the ground connection may also be briefly considered via a second battery supply line 52, which is a component part of battery connecting means 5. In addition, it is possible, in the case of several vehicle batteries, to provide further supply lines and/or battery connecting means.

The at least one connecting means 4 designed as a stub line is constructed as a hybrid cable, which is made up of at least one first supply line 41 for energy supply of electrical users 8 and/or of at least one first data line 43. If in each case only one supply line and/or data line is provided, the vehicle body is used as common ground connection for the energy and data transmissions. In a further embodiment, however, connecting means 4 may be made up of at least one additional supply line 42 and/or data line 44, in order to transmit data and energy completely autonomously from each other. On the other hand, it may be briefly considered, within the meaning of a power line connection, to transmit energy and data on a common line 41, while either the vehicle body or lines 42, 43, 44 are used as ground connection. In order to supply safety-relevant users 8 in a redundant manner, and/or ensure the supplying of users 8 that have to be active in the switched-off vehicle, such as the send/receive electronics system for a vehicle's own locking system, beyond that, the one additional supply line 42 may be designed as a closed circuit current line. In connection with superordinate voltage transformer 22 of superordinate control unit 2, one may also briefly consider a multivoltage vehicle electrical system having a first supply voltage of, for instance, 12 Volt and at least one additional supply voltage of, for instance, 42 Volt. In this case, the at least one additional supply line 42 may be supplied with a different voltage from that of first supply line 41.

Additional possible embodiments of the at least one connecting means 4 result as a function of additional criteria, such as the reliability required, the provision of redundant fall-back levels and/or the consideration of certain wake-up and switch-on concepts.

Superordinate interface 24 of superordinate control unit 2 is used for exchanging data from the at least one electrical user 8 with the at least one subordinate control system 6 via data line 43, 44 of the at least one connecting means 4, in the sense of a bidirectional communication. If an energy demand is sent via data line 43, 44 by the at least one subordinate control system 6 to superordinate control unit 2, superordinate control unit 2, with the aid of the at least one superordinate switching means 23, is able purposefully to deactivate and/or activate an additional connecting means 4, in order to fulfill the desired energy demand. This is required, for example, in the case of full braking. In order to be able to supply the brake power assist unit with sufficient energy, superordinate control unit 2, for example, switches off for a short time that particular connecting means 4 via which the less safety-related user in the dashboard area of the vehicle, such as the dashboard illumination, the auto radio, the air conditioning, etc, is being supplied with energy.

In superordinate control unit 2, furthermore, a superordinate current recording means 21 is provided which detects the overall current, flowing via the at least one superordinate switching means 23, of all the active electrical users 8 that are connected to the same connecting means 4. If the current that is flowing exceeds a predefined boundary value, for example, in the case of a short-circuit, superordinate control unit 2, with the aid of the at least one superordinate switching means 23, is able to deactivate accurately that particular connecting means 4 in which the exceeding of the current is occurring.

Finally, superordinate control unit 2 includes storage means 25, in which the state of the at least one subordinate control system 6 and/or the at least one electrical user 8 is able to be stored for the purpose of a later fault diagnosis.

Figure 3:
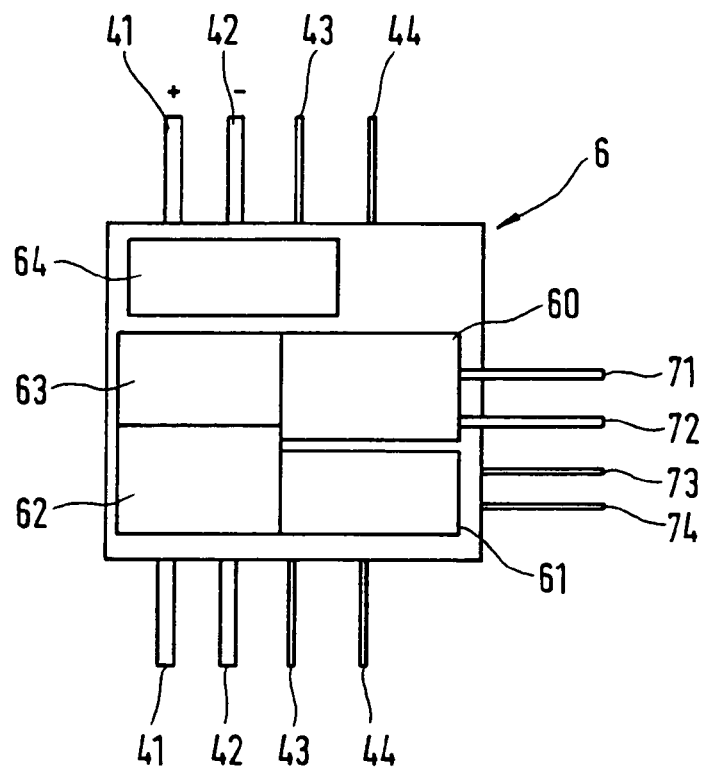
FIG. 3 shows a schematic representation of a possible embodiment for a subordinate control system.

FIG. 3 shows in an exemplary fashion a schematic representation of subordinate control system 6. This, for example, is made up of at least one subordinate switching means 60, a subordinate interface 61, a subordinate current recording means 62, a subordinate switching circuit logic 63, as well as subordinate voltage transformer 64. Subordinate control system 6 represents the connecting piece between connecting means 4 and electrical user 8 that is connected using branch line 7. Depending on the design of electrical user 8, one or more supply lines 71, 72 and/or data lines 73, 74 may be provided for branch line 7. Data communication is possible between electrical user 8 and the vehicle electrical system via subordinate interface 61. Besides a connection to superordinate control unit 2, in this context, direct communication is also provided between the subordinate control units 6 and electrical users 8 that are connected with them.

The switching function for the energy supply of a connected electrical user 8 is implemented via the at least one subordinate switching means 60, that is developed, for instance, as a power semiconductor. With the aid of current recording means 62, the current flowing via the at least one subordinate switching means 60 to electrical user 8 may be detected and supplied to subordinate switching circuit logic 63. It is also briefly considered that one might provide subordinate voltage recording means for recording the supply voltage before and/or after the at least one subordinate switching means 60. As a function of the measured current quantity and/or voltage quantity one may then detect different fault versions of electrical user 8, such as a line interruption, a short-circuit or a power surge at electrical user 8, and transmit it for storage to superordinate control unit 2. In addition, the subordinate voltage recording means permit monitoring of the at least one connecting means 4 between to adjacent, subordinate control systems 6. In this way, it is possible, for instance, to locate cable breaks of the at least one connecting means 4 in a very simple manner. Furthermore, it is provided that that one may control at least one subordinate switching means 60, as a function of the measured current, by subordinate control circuit logic 63, so that subordinate control system 6 is used as a substitute for a safety fuse that is required in the usual vehicles. In connection with the possibility of a direct communication between subordinate control systems 6, the function of a deactivated or no longer activatable electrical user 8 may the be taken over by an electrical user 8 that is carrying out a substitute function. Thus it is conceivable, for example that, in the case of the failure of a brake light, this function is taken over by the neighboring tail light for a time until the brake light's functioning has been restored. The local detection and evaluation of fault versions at electrical user 8 may accordingly be used for switching off electrical user 8 by subordinate control system 6, and/or for deactivating connecting means 4 that connects this user 8 to superordinate control unit 2, by superordinate control unit 2.

In subordinate control system 6, finally, another subordinate voltage transformer 64 is provided. It is used in the first place for the electrical supply of all structural components 60, 61, 62, 63 that are included in subordinate control system 6. In addition, subordinate voltage transformer 64 may also be used as a voltage source, in order to record the state of the switching elements, such as a relay, or the like, which are connected to subordinate control system 6.

In order to set up the modularity and the use of subordinate control system 6 in a flexible and economical manner, additional subordinate switching means may, for example, be provided for the purpose of an increased switching performance or for different switching functions, such as an H bridge, for motor control. Beyond that, it is conceivable that one might use subordinate control system 6 only for pure data recording, for instance, in connection with the switching elements that were mentioned and/or with light sensors, pressure sensors or sound sensors. In this case, one could do without the at least one subordinate switching means 60.

Figure 4:
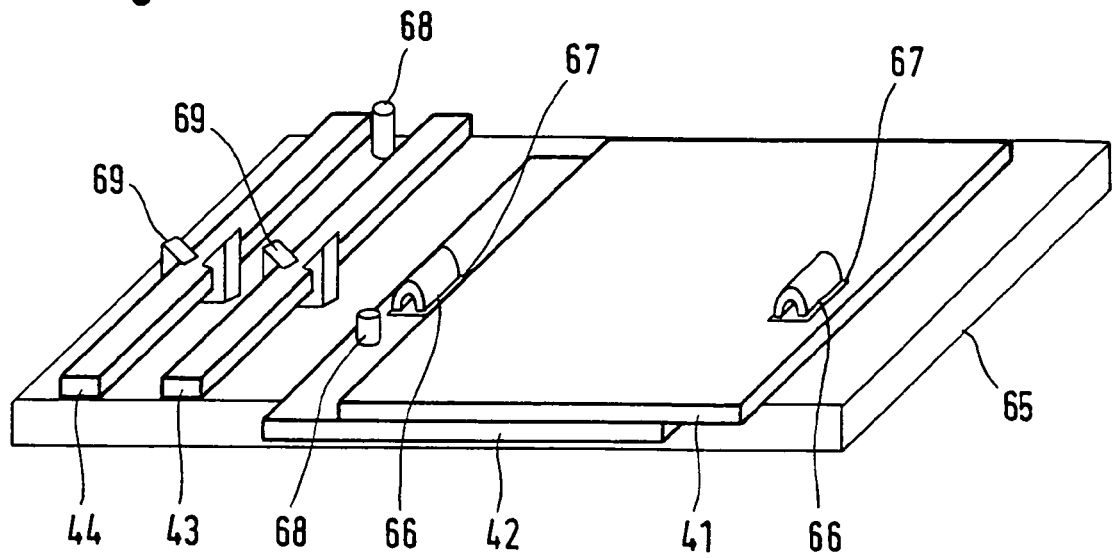
FIG. 4 shows a schematic representation of a possible embodiment for contacting the subordinate control system to a connecting means.

FIG. 4 shows a possible contacting of the at least one subordinate control system 6 to the at least one connecting means 4. One may recognize a pedestal 65 of subordinate control system 6, as well as at least one contact means 66, 69 for electrical connection to connecting means 4, and a fixing means 68. Connecting means 4 are designed, for instance, as a flat ribbon cable having, as was mentioned before, the at least one supply line 41, 42 and/or the at least one data line 43, 44. Based on the substantially higher electrical load-bearing capacity, supply line 41, 42 has in an advantageous manner a larger cross section than data line 43, 44. To save space, it is also of advantage in this case to position several insulated supply lines 41, 42 in an overlapping manner, as in FIG. 4. The contacting between subordinate control system 6 and connecting means 4 may now be done, for example, in such a way that the flat band lines 41, 42, 43, 44 are neither interrupted nor separated. To do this, stamped holes 67 may be provided at every desired location in connecting means 4 lay open the flat band line only in the immediate area of the contact location. When a cover of subordinate control system 6, that is not shown in FIG. 4, is set on top of this, contact means 66, designed fastening springs, are pressed into stamped holes 67, and an electrical connection is produced between connecting means 4 and subordinate control system 6. In the case of the relatively narrowly designed data lines 43, 44, contacting may also be done by clamp contacts 69, which surround the flat band lines at the location correspondingly provided. In an advantageous manner, contact means 66, 69 of subordinate control system 6 is situated on pedestal 65 in such a way that a polarity reversal may be excluded. This happens, for example, by differently sized stamped holes 67 and contact means 66, 69 and/or by an offset positioning of stamped holes 67 and contact means 66, 69 and/or by additionally applied fixing means 68. Consequently, rotation or slipping of subordinate control system 6 on connecting means 4 is not going to happen. Besides the possibility described here of contact formation between subordinate control system 6 and connecting means 4, other connecting techniques, such as screw connection or contacting using prepared stamped holes, in the sense of a perforation, may be considered.

Pedestal 65 and the cover of subordinate control system 6, in the assembled state, form a closed unit which is protected from the intrusion of dirt and moisture. In this context, in an advantageous manner, the entire electronic system 60, 61, 62, 63, 64, including cooling means and firmly connected branch line 7 are accommodated in the cover of subordinate control system 6.

The device according to the present invention for a data and energy management in a vehicle is not limited to the exemplary embodiment cited in the description. The same applies, by the way, to the superordinate control unit 2 according to the present invention, subordinate control system 6 according to the present invention and connecting means 4 according to the present invention. In addition, the device according to the present invention for a data and energy management is not limited to the application in a vehicle.

What is claimed is:

1. A device for performing a data and energy management in a vehicle, comprising:
    a superordinate control unit including a superordinate interface;
    at least one subordinate control system including a subordinate interface; and
    a connecting arrangement via which the superordinate control unit may be connected to the at least one subordinate control system, wherein:
    the superordinate control unit and the at least one subordinate control system exchange data in accordance with the subordinate interface via the connecting arrangement to achieve a bidirectional communication,
    the exchanged data relating to at least one electrical user,
    in the case of an energy demand by the at least one subordinate control system via the connecting arrangement, purposefully at least one additional connecting arrangement is able to be deactivated and/or activated by at least one superordinate switching arrangement of the superordinate control unit, in order to fulfill the energy demand,
    the superordinate control unit includes at least one superordinate current recording arrangement that detects an overall current, flowing via the at least one superordinate switching arrangement, of the at least one electrical user connected to the connecting arrangement, and
    the at least one superordinate current recording arrangement selectively deactivates the connecting arrangement if the flowing overall current exceeds a predefined boundary value.

2. The device as recited in claim 1, wherein the superordinate control unit includes an arrangement for storing a state of at least one of the at least one subordinate control system and the at least one electrical user.

3. The device as recited in claim 1, wherein:
    the at least one subordinate control system includes a voltage transformer capable of serving as a voltage source in order to record a state of switching elements, connected to the at least one subordinate control system, of the at least one electrical user.

4. The device as recited in claim 1, wherein:
the at least one subordinate control system includes a subordinate voltage recording arrangement for recording a supply voltage with which the at least one electrical user is supplied.

5. The device as recited in claim 4, wherein:
the subordinate voltage recording arrangement makes possible monitoring of the connecting arrangement between two adjacent subordinate control systems.

6. The device as recited in claim 1, wherein:
the at least one subordinate control system includes contact elements for connecting to the connecting arrangement, the contact elements excluding a polarity reversal.

7. The device as recited in claim 1, wherein:
data of a first of the at least one subordinate control system and a second of the at least one subordinate control system are exchangeable via the connecting arrangement in the sense of a direct communication with each other.

8. The device as recited in claim 7, wherein:
in connection with the direct communication between the first and second subordinate control systems, a function of a deactivated electrical user may be taken over by an electrical user that is carrying out a substitute function.

9. The device as recited in claim 1, wherein:
the connecting arrangement includes a flat band line having at least one of at least one supply line and at least one data line.

10. The device as recited in claim 9, wherein:
the flat band line includes a stub line that starts from a common neutral point.

11. The device as recited in claim 9, wherein:
in a multivoltage vehicle electrical system, a superordinate voltage transformer of the superordinate control unit supplies an additional supply line of the connecting arrangement with a different voltage from that of the at least one supply line.

12. The device as recited in claim 11, wherein:
the additional supply line includes a closed circuit current line,
safety-relevant users using the additional supply line are able to be redundantly supplied, and
a supply is ensured of the at least one electrical user that is to be active when the vehicle is switched off.

13. A device for performing a data and energy management in a vehicle, comprising:
a superordinate control unit including a superordinate interface;
at least one subordinate control system including a subordinate interface; and
a connecting arrangement via which the superordinate control unit may be connected to the at least one subordinate control system, wherein:
the superordinate control unit and the at least one subordinate control system exchange data in accordance with the subordinate interface via the connecting arrangement to achieve a bidirectional communication,
the exchanged data relating to at least one electrical user,
in the case of an energy demand by the at least one subordinate control system via the connecting arrangement, purposefully at least one additional connecting arrangement is able to be deactivated and/or activated by at least one superordinate switching arrangement of the superordinate control unit, in order to fulfill the energy demand, and
the at least one subordinate control system includes at least one subordinate current recording arrangement that detects a current flowing via at least one subordinate switching arrangement and supplies the current to a subordinate switching circuit logic for evaluation, as a function of which the at least one subordinate switching arrangement is able to be controlled.

* * * * *